United States Patent [19]

Nagaura et al.

[11] Patent Number: 4,891,282
[45] Date of Patent: Jan. 2, 1990

[54] ORGANIC ELECTROLYTE CELL

[75] Inventors: Toru Nagaura; Shigeru Oishi, both of Fukushima, Japan

[73] Assignee: Sony-Eveready Inc., Tokyo, Japan

[21] Appl. No.: 138,347

[22] Filed: Dec. 28, 1987

Related U.S. Application Data

[63] Continuation of Ser. No. 842,180, Mar. 21, 1986, abandoned.

[30] Foreign Application Priority Data

Mar. 22, 1985 [JP] Japan ................................ 60-58044
Jan. 21, 1986 [JP] Japan ................................ 59-10904

[51] Int. Cl.$^4$ ............................................. H01M 6/16
[52] U.S. Cl. ................................... 429/194; 429/218; 429/224
[58] Field of Search ................... 429/194, 218, 224

[56] References Cited

U.S. PATENT DOCUMENTS

| 4,002,492 | 1/1977 | Rao | 429/218 |
| 4,056,885 | 11/1977 | Rao | 429/218 |
| 4,328,288 | 5/1982 | Taylor | 429/40 |
| 4,434,213 | 2/1984 | Niles et al. | 429/3 |

*Primary Examiner*—Anthony Skapars
*Attorney, Agent, or Firm*—Hill, Van Santen, Steadman & Simpson

[57] ABSTRACT

An organic electrolyte cell is disclosed which comprises an anode mainly composed of Li and containing Al and a cathode mainly composed of manganese dioxide, wherein the amounts for Li, Al and manganese dioxide are determined such that they are included within a region surrounded by:

$y = 0.2\,x + 0.055$ $y = 0.2\,x + 0.080$ $x \geq 0.03$ where x represents the ratio t2/t1 between the thickness t1 for Li and the thickness t2 for Al for expressing the ratio of amounts between Li and Al constituting the anode; and y represents the weight ratio (Li/MnO$_2$) between Li and manganese dioxide whereby the increase in the internal resistance at the final stage of the discharge is suppressed, so that the cell capacity can be utilized effectively to the last.

4 Claims, 5 Drawing Sheets

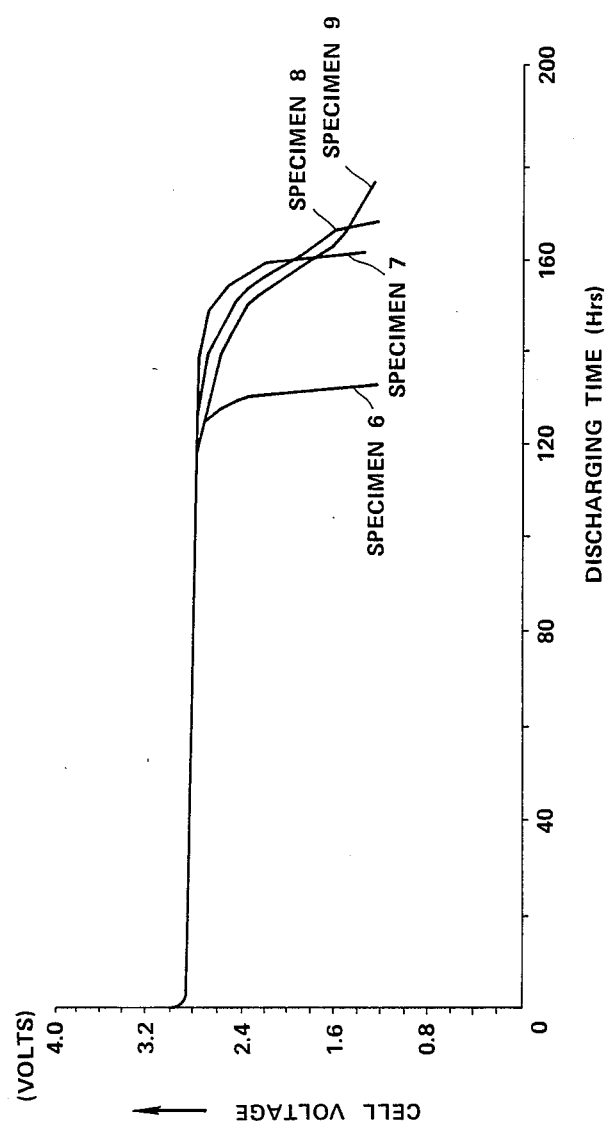

ORGANIC ELECTROLYTE CELL

This is a continuation of application Ser. No. 842,180, filed 3/21/86 now abandoned.

BACKGROUND OF THE INVENTION

1. Field of the Invention

This invention concerns an organic electrolyte cell using Li for the anode, manganese dioxide for the cathode and an organic solvent as an electrolyte and, more specifically, it relates to an improvement in the internal resistance of the cell of this kind.

2. Prior Art

It has been known that an organic electrolyte cell using metal lithium with a high electronegativity as an anode active substance and using maganese dioxide as cathode active substance has a cell voltage as high as about 3 V due to the extremely low electrode potential of the metal lithium and it also has a high energy density due to the large electrical capacity of the metal lithium per unit weight. In the cell of this kind, an electrolyte such as lithium perchlorate dissolved in an organic solvent, for example, propylene carbonate is used as the liquid electrolyte and, since both the lithium metal and manganese dioxide are extremely stable in this electrolyte, the cell capacity is not lowered even after a long time storage, which makes the cell extremely desirable in view of the storability.

Accordingly, the application use of the organic electrolyte cell has been increased more and more in recent years as a back-up power source for electronic watches or IC memories that demand high reliability for a long period of time.

However, the aforementioned cell has a drawback that the internal resistance of the cell increases along with the discharge and such internal resistance also increases during storage at high temperature and, accordingly, improvement therefor is a serious problem. The increase in the internal resistance of the cell hinders the effective utilization of the cell. For example, if a large pulse current is taken at the final stage of the discharge, the cell voltage is lowered remarkably due to the high internal resistance and the capacity of the cell can not effectively be utilized to the last in the case of taking out large current pulses.

The cause for the increase in the internal resistance may be attributable to the following act. That is, since the metal lithium is highly active although stable in the organic liquid electrolyte, the surface of the metal lithium gradually reacts with the organic liquid electrolyte to form inactive compound membranes on the surface thereof with the progress of the cell discharge or during storage under high temperature.

In this case, the degree of reaction gives no substantial effects on the cell capacity but, since the membranes formed on the lithium surface greatly hinder the anode reaction of lithium, they increase the internal resistance of the cell.

In view of the above, although the use of lithium-aluminum alloys has been proposed, for example, in U.S. Pat. Nos. 4,002,492 and 4,056,885 for overcoming such drawbacks, no organic electrolyte cells with satisfactory performance have yet been obtained merely by such proposals per se.

Generally, the discharging reaction in the lithium cell using manganese dioxide as the cathode active substance is considered as:

$$Mn^{IV}O_2 + Li \rightarrow Li + Mn^{III}O_2$$

In such a lithium cell, lithium on the anode transfers to the cathode upon discharge and the amount of the discharging products on the cathode is increased along with the discharge to increase the internal resistance. Further, since the opposing area of the lithium electrode is decreased at the final stage of the discharge due to the transfer of the anode lithium, abrupt increase in the internal resistance is caused.

OBJECT AND SUMMARY OF THE INVENTION

As described above, increase in the internal resistance at the final stage of the discharge is inevitable in the organic electrolyte cell of the prior art, which a greatly hinders the effective utilization of the cell.

In view of the above, this invention has been proposed for overcoming the foregoing drawbacks involved in the conventional organic electrolyte cells and it is an object thereof to provide an organic electrolyte cell capable of suppressing the increase in the internal resistance at the final stage of the discharge and capable of effectively utilizing the capacity of the cell to the last by the region in which the internal resistance is suppressed.

This invention provides an organic electrolyte cell comprising an anode mainly composed of Li and containing Al and a cathode mainly composed of manganese dioxide, wherein the amounts for Li, Al and manganese dioxide are determined such that they are included within a region surrounded by:

$$y = 0.2x + 0.055$$

$$y = 0.2x + 0.080$$

$$x \geq 0.03$$

where x represents the ratio t2/t1 between the thickness t1 for Li and the thickness t2 for Al for expressing the ratio of the amounts between Li and Al constituting the anode; and y represents the weight ratio (Li/MnO$_2$) between Li and manganese dioxide whereby the increase in the internal resistance at the final stage of the discharge is suppressed, so that the cell capacity can be utilized effectively to the last.

BRIEF DESCRIPTION OF THE DRAWINGS

FIG. 6 is a characteristic chart showing the change in the discharging voltage curve accompanying the change in the weight ratio for Li/MnO$_2$.

DESCRIPTION OF THE PREFERRED EMBODIMENTS

The present inventors have made an earnest study since long years in order to improve the resistance property of the organic electrolyte cell and, as a result, have found that the inactivation at the lithium surface can be decreased to thereby suppress the increase in the internal resistance by using aluminum-containing lithium for the anode, as well as that the region in which the internal resistance is suppressed can be extended by setting the amounts of lithium and aluminum for the anode and manganese dioxide for the cathode within a predetermined region.

This invention has been accomplished based on the foregoing knowledge and the features thereof resides in an organic electrolyte cell comprising an anode mainly composed of Li and containing Al and a cathode mainly composed of manganese dioxide, wherein the amounts for Li, Al and manganese dioxide are determined such that they are included within a region surrounded by:

$y = 0.2x + 0.055$ $y = 0.2x + 0.080$ $x \geq 0.03$ where x represents the ratio t2/t1 which is a ratio of between the thickness t1 for Li and the thickness t2 for Al for expressing the ratio of the amounts between Li and Al constituting the anode; and y represents the weight ratio (Li/MnO$_2$) between Li and manganese dioxide.

Figure 1:
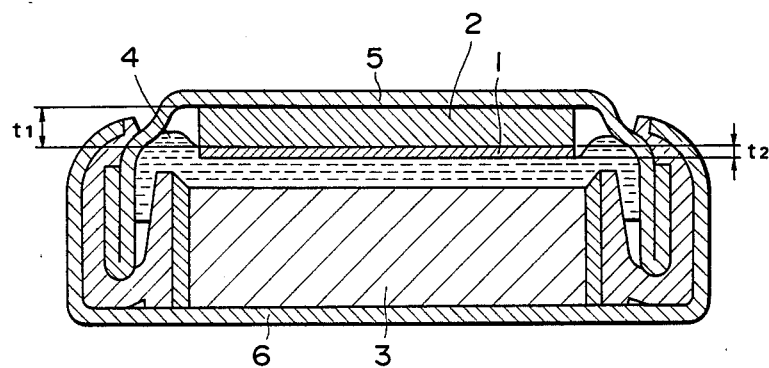
FIG. 1 is a cross sectional view of an organic electrolyte cell according to this invention.

The organic electrolyte cell according to this invention comprises, for example, as shown in FIG. 1, metal lithium 2 appended at the surface thereof with an aluminum foil 1 as an anode active substance, manganese dioxide pellets 3 such as electrolytic manganese dioxide as a cathode active substance, which are filled by way of a separator 4 containing an organic liquid electrolyte into an anode can 5 and a cathode can 6 respectively. The organic liquid electrolyte usable herein can include generally those electrolytes such as lithium perchlorate or lithium borofluoride dissolved in a solvent such as propylene carbonate, butyrolactam, tetrahydrofuran, 1,2-dimethoxyethane and 1,3-dioxolan or a mixture of two or more of such solvents.

For the anode active substance, the ratio between the amount of the metal lithium 2 and that of the aluminum foil is important and, assuming the thickness of the metal lithium 2 as t1 and the thickness of the aluminum foil 1 as t2, it is preferred that the ratio t2/t1 (hereinafter simply referred as x) is greater than 0.03. If the ratio is less than 0.03, that is, if the amount of lithium is excessive, no sufficient suppression can be attained for the increase in the internal resistance. On the contrary, the internal resistance at the final stage of the discharge can be suppressed provided that the value for x is greater than 0.03. However, if the value is too great, that is, the amount of aluminum is excessive, the cell capacity may possibly be reduced. Although the reason for the reduction has not yet been clear at present, it may be attributable to the fact that the metal lithium diffuses into the aluminum foil appended thereto to form a Li-Al alloy with the aluminum foil by which a portion of Li can no more contribute directly to the cell reaction. Accordingly, the practical range for the ratio is: $0.03 \leq x \leq 0.10$.

While the aluminum foil is appended on the surface of the metal lithium in this embodiment, aluminum may also be contained to the surface of lithium in the form of alloy. Also in this case, the composition may be such that the amount of aluminum corresponds to the ratio of the thickness as described above.

According to the experiment made by the present inventors, it has been found that there is a correlationship between the ratio x of lithium to aluminum and the weight ratio y of lithium to manganese dioxide and the capacity of the anode is equalized with that of the cathode in a range satisfying the relationship:

$y = 0.2x + 0.064 - y = 0.2x + 0.067$ and the cell capacity shows the maximum value.

When the cell is designed with the excess amount of lithium, the discharge characteristics of the cell near the end of the cell life drops sharply. This discharge characteristics is preferable for a special usage of the cell, for example, to notify the end of cell life. In such usage, for designing the cell as the anode dependent structure, it is preferable to set the relationship.

$y \leq 0.2x + 0.067$

While on the other hand, when aluminum is incorporated to the surface of the metal lithium as the anode active substance as described above, substantial amount of lithium concerning the cell reaction is decreased. Therefore, in order to extend the range in which the internal resistance is suppressed, it is necessary to make the capacity of the anode lithium is made greater than that of the cathode, that is, to provide a cathode-dependent constitutes and, further, to properly set the weight ratio between lithium and manganese dioxide while also taking the aluminum content into consideration.

In view of the cathode-dependent structure, the relationship is determined in this invention as:

$y \geq 0.2x + 0.067$

That is, as the weight ratio of lithium to manganese dioxide is increased, the anode capacity is increased more to extend the region in which the internal resistance is suppressed.

Considering that discharge capacity for the practical use, it is preferred to have the capacity of not less than 130 mAH. In this connection, it is preferred to satisfy the following relationship.

$y \geq 0.2x + 0.055$

However, since the cell capacity tends to be decreased as the weight ratio y increases, it is practically preferred in view of the discharging capacity to determine the relationship as:

$y \leq 0.2x + 0.080$

In this case, the amount of manganese dioxide as described above is defined as the weight of commercially available electrolytic manganese dioxide after subjected to heat treatment at a temperature of 200° to 600° C.

In this way, by using aluminum-containing metal lithium as the anode active substance in the organic electrolyte cell, determining the ratio of the amount between aluminum and lithium within a predetermined range, and setting the ratio y between the amount of lithium and that of manganese dioxide at the cathode within a predetermined range corresponding to the ratio x between the amount of aluminum to that of lithium, inactivation at the surface of the anode can be prevented to suppress the increase in the internal resistance and the region in which the internal resistance is suppressed can be extended.

EXPERIMENTAL EXAMPLE 1

9.3 parts by weight of graphite were added to 88.9 parts by weight of commercially available electrolytic manganese dioxide heat-treated at 300° C. for about 5 hours and, further, 1.8 parts by weight of polytetrafluoroethylene (commercial name: teflon) were added as a binder to prepare a cathode mix, which was shaped into 15.5 mm diameter and 0.655 g weight to manufacture a cathode pellet.

Then, a lithium foil 0.40 mm thick was punched into 15.5 mm diameter and appended to an anode cup. Further, an aluminum foil in 0.007–0.06 mm thickness was punched into the same diameter was pressed and appended on the lithium foil to form a lithium anode.

Further, a separator was placed on the lithium anode and a plastic gasket is fitted, into which 1 mol/liter of $LiClO_4$ dissolved in propylene carbonate was poured as the liquid electrolyte and the cathode pellet prepared as above was placed. Then, a cathode can was capped and sealed to assemble an organic electrolyte cell as shown in FIG. 1.

Various specimens were prepared with the ratio of Al/Li thickness as 0.00175 for specimen 1, 0.037 for specimen 2, 0.074 for specimen 3, 0.112 for specimen 4 and 0.150 for specimen 5.

Further, organic electrolyte cells were assembled without appending the aluminum foils in the same manner as each of the specimens described above and used as comparative examples.

The change in the internal resistance was examined for each of the specimens and comparative examples. The results are shown in FIG. 2.

Figure 2:
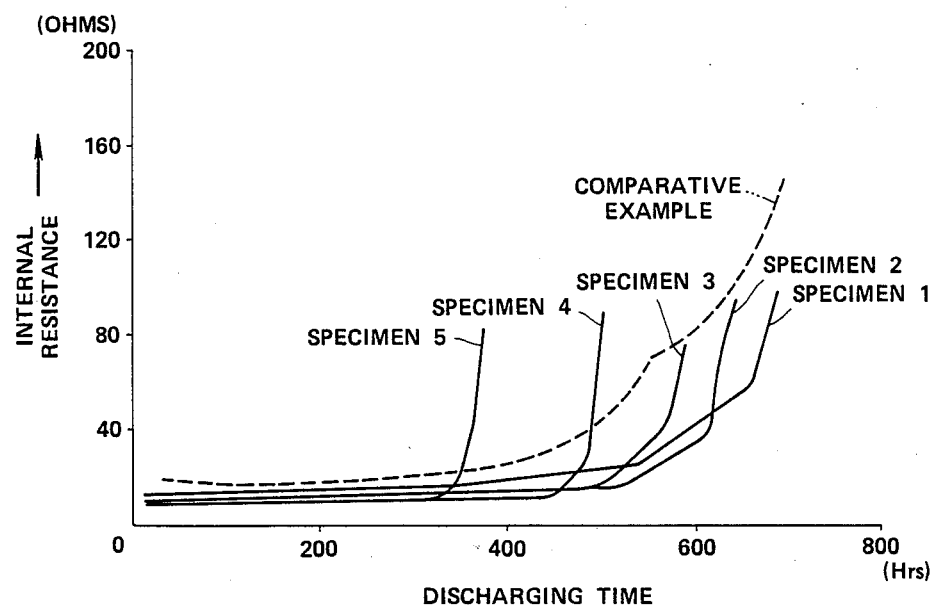
FIG. 2 is a characteristic chart showing the change in the internal resistance accompanying the change in the thickness ratio Al/Li.

It was found, from FIG. 2, that the cells with the lithium anode appended with aluminum foil had extremely reduced internal resistance as compared with the comparative examples and showed less change in the internal resistance during discharge or storage.

Figure 4:
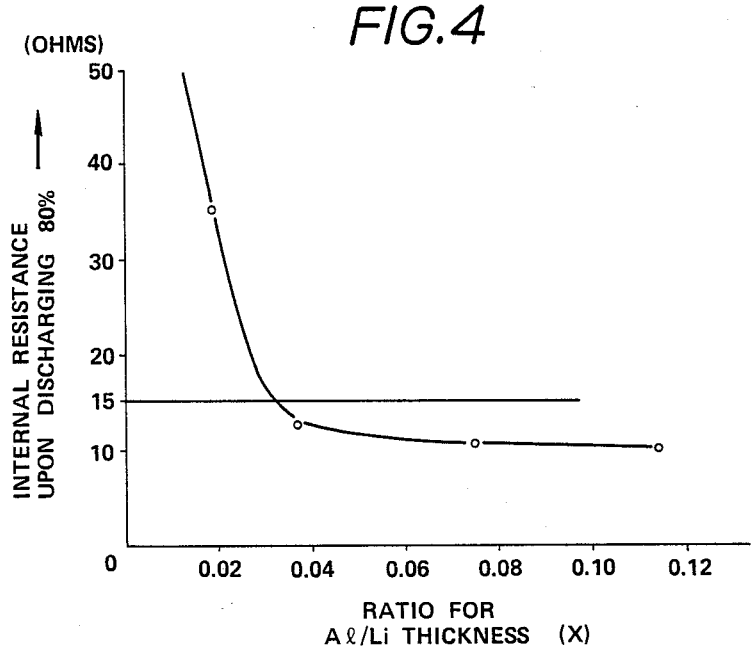
FIG. 4 is a characteristic chart showing the relationship between the thickness ratio of Al/Li and the internal resistance value at 80% discharge.

In order to make the trend clearer, the relationship between the thickness ratio of Al/Li and the internal resistance of the cell after 80% discharge was examined. The results are shown in FIG. 4. It was found from FIG. 4 that the internal resistance was lowered remarkably as the Al content increased.

Figure 3:
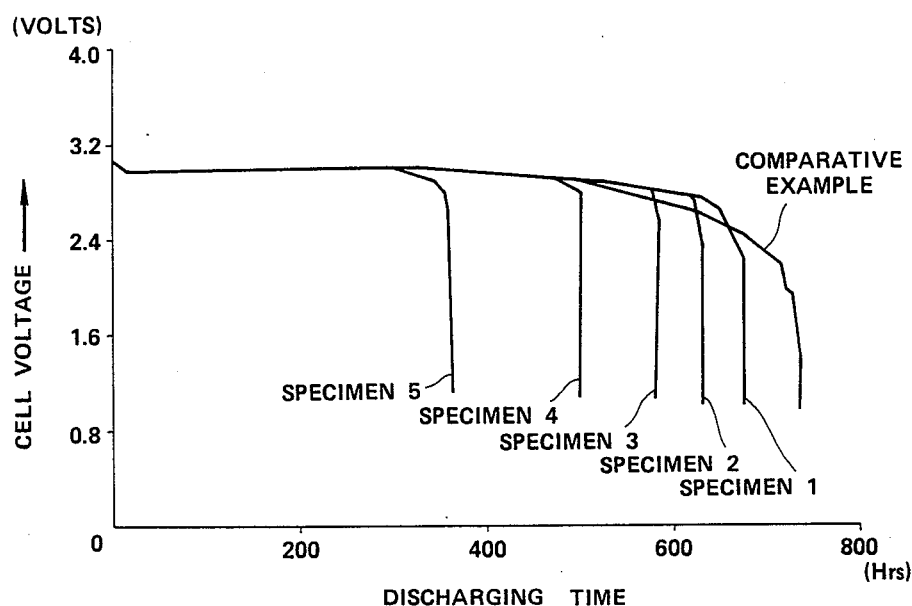
FIG. 3 is a characteristic chart showing the change in the discharging voltage curve accompanying the change in the thickness ratio of Al/Li.

However, the following disadvantage was still present. In a cell where the aluminum foil 1 was appended to lithium, while the internal resistance is lowered and the resistance change was decreased during discharge as the thickness ratio of the Al/Li was increased as shown in FIG. 2, the electric capacity was, conversely, reduced as shown in FIG. 3 and the amount of the reduction was greater as the thickness ratio of the Al/Li was greater.

Accordingly, in the organic electrolyte cell using lithium appended with the aluminum foil as the anode, it is necessary to determine the weight ratio for $Li/MnO_2$ while taking the Al content into consideration.

In view of the above, the present inventors have determined an appropriate weight ratio for $Li/MnO_2$ of the organic electrolyte cell in which lithium appended with the aluminum foil was used as the anode by the following experiment.

EXPERIMENTAL EXAMPLE 2

It was found seen from the Experimental Example 1 that a desired internal resistance value (less than 15 ohm) up to 80% discharge was attained when the thickness ratio of Al/Li was greater than 0.03.

Then, aluminum foils of various thickness were appended to the lithium foils of the anode cap to prepare those specimens with the thickness ratio of Al/Li ranging from 0.03 to 0.10.

Further, cathode pellets containing various weight of $MnO_2$ (heat-treated at 300° 1 C. for 4 hours) were prepared and organic electrolyte cells of the constitution as shown in FIG. 1 were assembled in the same manner as in the previous Experimental Example 1. In these cells, the outer diameter was set to 20 mm and the height to 2.45 mm.

Each of the cells thus obtained had the thickness a ratio of Al/Li from 0.03 to 0.10 and the weight ratio for $Li/MnO_2$ from 0.060 to 0.090.

Each of the cells was caused to discharge at a constant resistance of 3 kΩ and the capacity was measured. The results are shown in the table below.

TABLE

| Li/MnO | Al/Li | | | | | | | |
|---|---|---|---|---|---|---|---|---|
| | 0.03 | 0.04 | 0.05 | 0.06 | 0.07 | 0.08 | 0.09 | 0.10 |
| 0.060 | (131) | (127) | (123) | (120) | (116) | (112) | (109) | (105) |
| 0.061 | (133) | (129) | (125) | (121) | (117) | (114) | (110) | (106) |
| 0.062 | (134) | (130) | (126) | (121) | (119) | (115) | (111) | (108) |
| 0.063 | (136) | (132) | (128) | (124) | (120) | (116) | (113) | (109) |
| 0.064 | (137) | (133) | (129) | (125) | (121) | (118) | (114) | (110) |
| 0.065 | (139) | (135) | (131) | (127) | (123) | (119) | (115) | (111) |
| 0.066 | (141) | (136) | (132) | (128) | (124) | (120) | (116) | (112) |
| 0.067 | (142) | (138) | (134) | (130) | (125) | (121) | (118) | (114) |
| 0.068 | (144) | (139) | (135) | (131) | (127) | (123) | (119) | (115) |
| 0.069 | (145) | (141) | (137) | (132) | (128) | (124) | (120) | (116) |
| 0.070 | (147) | (142) | (138) | (134) | (129) | (125) | (121) | (117) |
| 0.071 | (148) | (144) | (139) | (135) | (131) | (126) | (122) | (118) |
| 0.072 | 150 | (145) | (141) | (136) | (132) | (128) | (124) | (119) |
| 0.073 | 149 | (147) | (142) | (138) | (133) | (129) | (125) | (121) |
| 0.074 | 148 | 147 | (144) | (139) | (135) | (130) | (126) | (122) |
| 0.075 | 148 | 146 | 145 | (140) | (136) | (131) | (127) | (123) |
| 0.076 | 147 | 146 | 144 | (142) | (137) | (133) | (128) | (124) |
| 0.077 | 147 | 145 | 144 | 142 | (138) | (134) | (129) | (125) |
| 0.078 | 146 | 145 | 143 | 142 | (139) | (135) | (130) | (126) |
| 0.079 | 146 | 144 | 143 | 141 | 140 | (136) | (132) | (127) |
| 0.080 | 145 | 144 | 142 | 141 | 139 | (137) | (133) | (128) |
| 0.081 | 145 | 143 | 142 | 140 | 139 | 137 | (134) | (129) |
| 0.082 | 144 | 143 | 141 | 140 | 138 | 137 | (135) | (130) |
| 0.083 | 144 | 142 | 141 | 139 | 138 | 136 | 135 | (131) |
| 0.084 | 143 | 141 | 140 | 138 | 137 | 136 | 134 | (132) |
| 0.085 | 142 | 141 | 139 | 138 | 136 | 135 | 134 | 132 |
| 0.086 | 142 | 140 | 139 | 137 | 136 | 135 | 133 | 132 |
| 0.087 | 141 | 140 | 138 | 137 | 135 | 134 | 133 | 131 |
| 0.088 | 141 | 139 | 138 | 136 | 135 | 133 | 132 | 131 |
| 0.089 | 140 | 139 | 137 | 136 | 134 | 133 | 132 | 130 |
| 0.090 | 140 | 138 | 137 | 135 | 134 | 132 | 131 | 130 |

In the table, numerals in the brackets show the case where the capacity of the cathode is greater than that of the anode lithium, that is, the case of the anode-dependent cell. In this instance, the region in which the internal resistance is suppressed is narrow.

Figure 5:
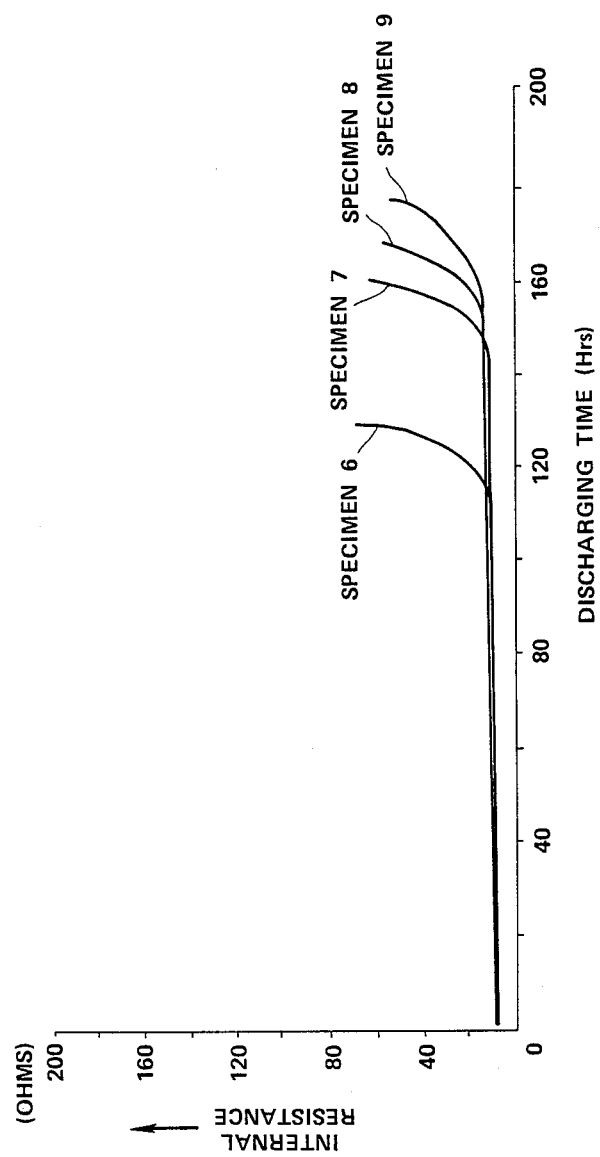
FIG. 5 is a characteristic chart showing the change in the internal resistance accompanying the change in the weight ratio for Li/MnO$_2$ with the thickness ratio of Al/Li being constant.

Among each of the specimens in the table, the present inventors examined the change in the internal resistance and the discharging characteristics for the specimen 6 with the thickness ratio x of Al/Li of 0.05 and the weight ratio y for Li/MnO$_2$ of 0.065; the specimen 7 with y of 0.07, the specimen 8 with y of 0.076 and the specimen 9 with y of 0.082 respectively. The changes on the internal resistance are shown in FIG. 5 and the discharging characteristics are shown in FIG. 6 respectively. The specimen 6 is an anode-dependent cell.

It was found from FIGS. 5 and 6 that the specimen 6, the anode-dependent cell, had a narrower region in which the internal resistance was suppressed and was disadvantageous as compared with each of the specimens (specimens 7 and 3) according to this invention in view of the effective utilization of the cell capacity.

From the above experimental results, the present inventors have attained the following conclusions. That is, as seen from the table, the cell capacity is maximum at a relationship that the weight ratio y for Li/MnO$_2$ is represented as y=0.2x+0.064~y=0.2x+0.067 where x is the thickness ratio of Al/Li.

Accordingly, in case of the anode-dependent cell in which the internal resistance is effectively suppressed and the discharge characteristics drops sharply at the end of cell life can be obtained for the region covered by the relationship y≦0.2x+0.067. Considering the discharge capacity, it is preferable to make the cell with the relationship y≧0.2x+0.055. While a cathode-dependent cell with an extended region in which the internal resistance is suppressed can be obtained at least for the ratio: y≧0.2x+0.067. This can also be demonstrated from FIGS. 5 and 6. While on the other hand, the cell capacity is decreased at the weight ratio y for Li/MnO$_2$ increases in the region: y≧0.2x+0.067 from the above table. Then, in view of the practical range, it is better to determine the ratio as: y≦0.2x+0.080.

Based on the result of the experiment, the range in this invention is defined as the region surrounded by:

y=0.2x+0.067 y=0.2x+0.080

Figure 7:
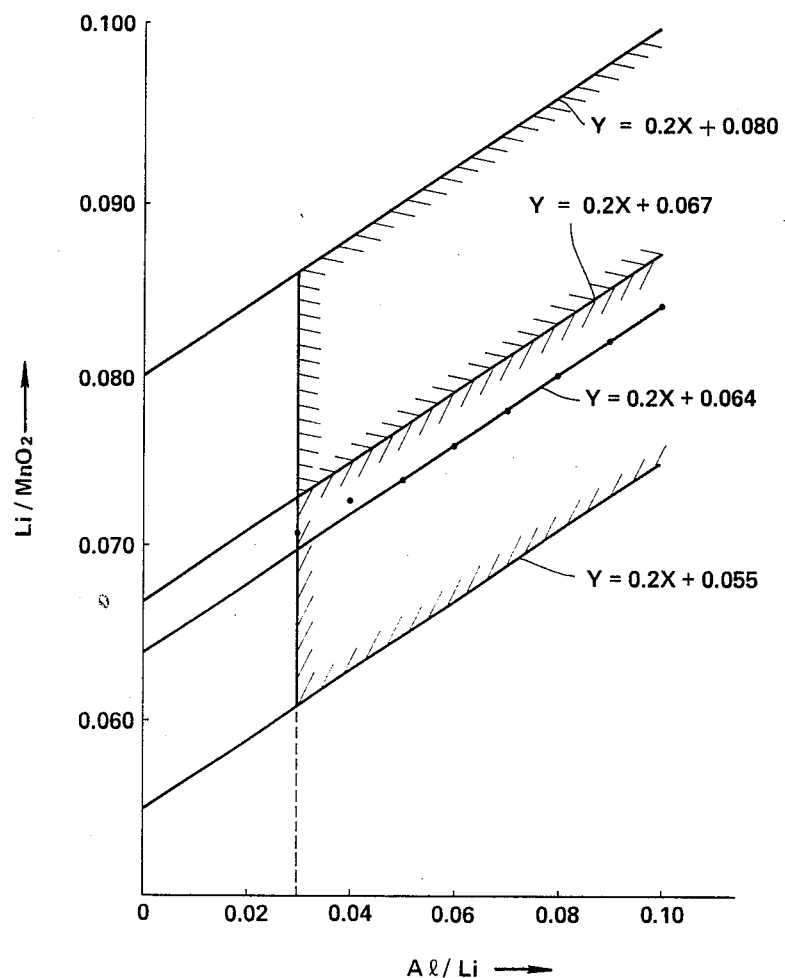
FIG. 7 is a characteristic chart showing a range preferred in view of the internal resistance and the cell capacity as the relationship between the thickness ratio (x) of Al/Li and the weight ratio (y) for Li/MnO$_2$.

The region is illustrated in FIG. 7 as the area shown by the hatched lines.

As apparent from the foregoing explanations, since the aluminum-containing metal lithium is used as the anode and the amount of lithium and that of manganese dioxide at the cathode are determined while taking the aluminum content into consideration in the organic electrolyte cell according to this invention, the internal resistance is extremely reduced.

In addition, the organic electrolyte cell according to this invention has an extended region in which the internal resistance is suppressed and the capacity of the cell can be utilized effectively to the last.

We claim as our invention:

1. An organic electrolyte cell comprising an anode mainly composed of Li and containing Al and a cathode mainly composed of manganese dioxide, wherein the amount of manganese dioxide is determined based on the ratio of Li to Al, the amount of Li, Al and manganese dioxide being determined such that they are included within a region surrounded by:

y=0.2x+0.055 y=0.2x+0.080

0.10≧x≧0.03 where x represents the ratio t2/t1 between the thickness t1 for Li and the thickness t2 for Al for expressing the ratio of the amounts between Li and Al constituting said anode; and y represents the weight ratio (Li/MnO$_2$) between Li and manganese dioxide.

2. An organic electrolyte cell comprising an anode mainly composed of lithium and containing aluminum and a cathode mainly composed of manganese dioxide, wherein the ratio of manganese dioxide to lithium is determined as a function of the thickness ratio of lithium to aluminum.

3. The organic electrolyte cell of claim 2 wherein the amounts of Li, Al and manganese dioxide are determined such that they are included within a region surrounded by:

y=0.2x+0.067 y=0.2x+0.055

0.10≧x≧0.03 where x represents the ratio t2/t1 between the thickness t1 for Li and the thickness t2 for Al for expressing the ratio of the amounts between Li and Al constituting said anode; and y represents the weight ratio (Li/MnO$_2$) between Li and manganese dioxide.

4. The organic electrolytic cell of claim 2 wherein the amounts for Li, Al and manganese dioxide are determined such that they are included within a region surrounded by:

y=0.2x+0.067 y=0.2x+0.080

0.10≧x≧0.03 where x represents the ratio t2/t1 between the thickness t1 for Li and the thickness t2 for Al for expressing the ratio of the amounts between Li and Al constituting said anode; and y represents the weight ratio (Li/MnO$_2$) between Li and manganese dioxide.

* * * * *